UNITED STATES PATENT OFFICE.

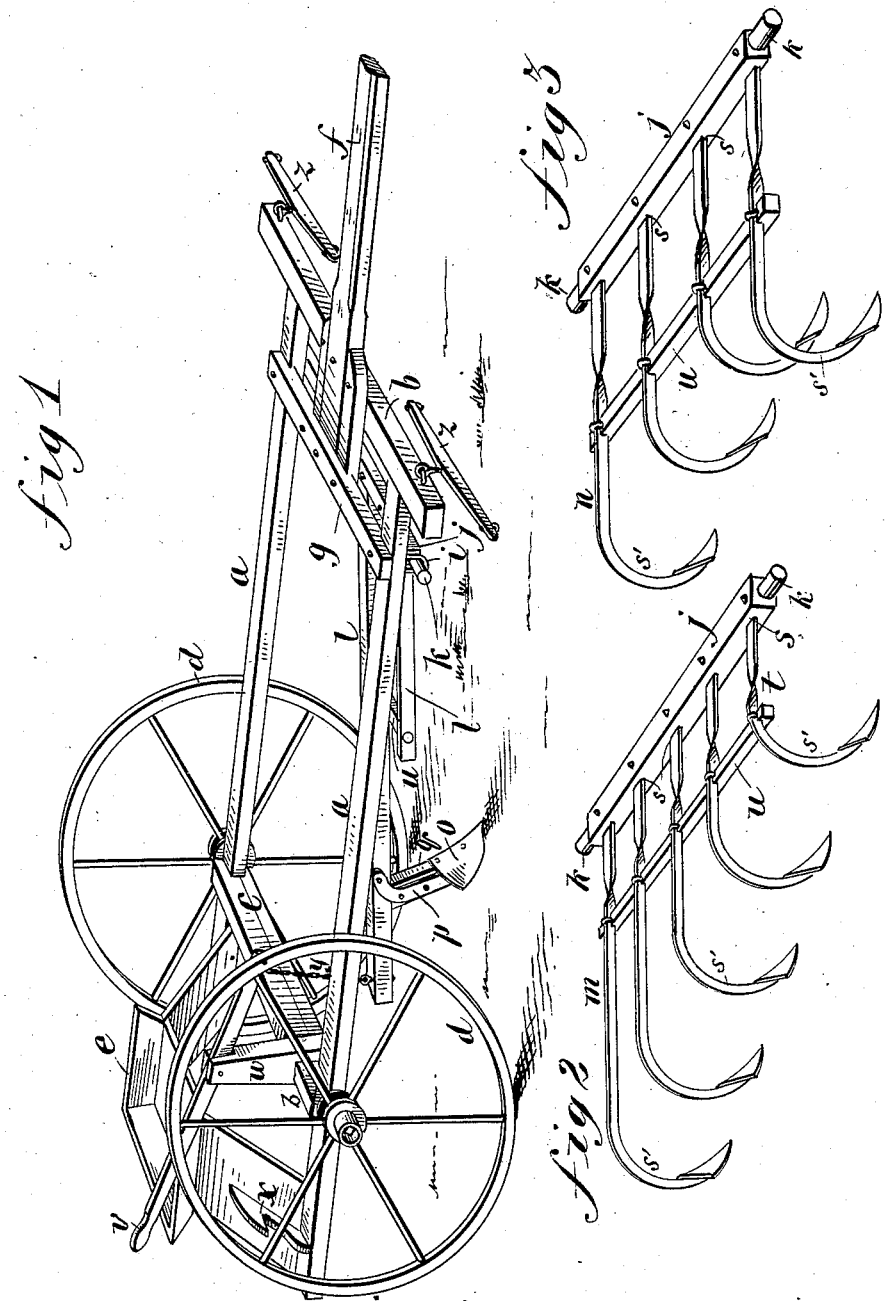

JOHN J. HUSSEY, OF BORDEAUX, SOUTH CAROLINA, ASSIGNOR TO HIMSELF, AND W. W. TINSLEY, OF HUNTSVILLE, TEXAS.

SULKY-PLOW.

SPECIFICATION forming part of Letters Patent No. 284,558, dated September 4, 1883.

Application filed March 10, 1883. (No model.)

*To all whom it may concern:*

Be it known that I, JOHN J. HUSSEY, of Bordeaux, in the county of Abbeville and State of South Carolina, have invented a new and Improved Sulky-Plow, of which the following is a full, clear, and exact description.

This invention consists of a contrivance for the construction of sulky-plows in a simple and cheap manner, and so as to make an efficient machine, capable of working easily and doing the work well, and adapted for the use of any form of plow and for the substitution of a harrow and also a cultivator, the plow, harrow, and cultivator attachments being all contrived for like application to the sulky, all as hereinafter fully described.

Reference is to be had to the accompanying drawings, forming part of this specification, in which similar letters of reference indicate corresponding parts in all the figures.

Figure 1 is a perspective view of my improved sulky-plow. Fig. 2 is a perspective view of the harrow attachment; Fig. 3, a similar view of the cultivator attachment adapted for substitution in the place of the plow, when required, and Fig. 4 is a detail.

I mount a simple frame consisting of side bars, $a$, and end bars, $b$, on the axle $c$ of a pair of wheels, $d$, locating said frame thereon so that it extends mostly to the front of the axle, the rear extension being simply sufficient for the support of a seat, $e$, for the driver, while the front reaches sufficiently forward to provide the requisite space between the axle and the front end for the plows and other attachments. The tongue $f$ is rigidly connected to the front end of the frame, or near it, by the tongue-beam $g$, suitably bolted to the side bars of the frame to support the front end, and under said tongue-beam, or thereabout, I provide staple or other bearings, $i$, for the support of a shaft, $j$, by its journals $k$, by which the plows, cultivator, or harrow are to be attached, all being alike provided with such a shaft, and in practice I will make said staple-bearings of suitable length to enable me to set the said shaft $j$ higher or lower, as may be required, by means of blocks $t$, of different sizes, placed under and over the journals, the object being to vary the height of the connection and regulate the depth of the plows in the ground. The plow-beams $l$, harrow-beams $m$, and cultivator-beams $n$ will all be attached to such a shaft, $j$, so that either one of the different attachments may be applied at will.

I propose to employ two plows, $o$, which will by preference be connected to the beam by two side bars, $p$, and a center wood piece, $q$, forming the plow-stocks; but these may be constructed in any other approved form for plows of various forms.

For the cultivator and harrow plow beams I propose to employ flat bar-iron, which will be fitted flatwise in the shafts $j$, as represented at $s$, and a little back of said shafts will be twisted a quarter of a turn for turning said bars edgewise to the strain along the bends $s'$, and all the beams will be connected together by a stay-bar, $u$, for stability. A lever, $v$, is mounted alongside of the driver's seat in a suitable standard, $w$, for raising the plows or other attachments above the ground by chain $y$, and supporting them by a catch, $x$, when required. The whiffletrees $z$ are attached to the front end beam, $b$, of the frame, but may be attached in any approved way.

It will be seen that the construction is so simple that all the parts except the wheels may be made by any person having ordinary skill with tools.

The right-hand wheel will, by running in the furrow, guide the machine properly as to the gaging of the plows to the unplowed ground, and the connection of the attachments to the frame by the shafts $j$ furnishes the requisite means of controlling them as to lateral deviation.

Having thus described my invention, what I claim as new, and desire to secure by Letters Patent, is—

The combination, with the wheel $d$, axle $c$, and elongated open frame $a\ b$, provided with opposite staples or journal-bearings, $i$, on the under face of the front of its side bars, $a$, of a shaft, $j$, having journals $k$ fitting in the bearings $i$, and adapted to carry a plow, harrow, or cultivator attachment, blocks $t$, and a seat, $e$, arranged in rear of the plow, harrow, or cultivator, substantially as described, whereby the latter can be adjusted vertically as desired, and be in view of the driver, as set forth.

JOHN J. HUSSEY.

Witnesses:
W. T. SLAUGHTER,
N. M. BONCHILLON.